JEAN DEGONDE &
HENRI BAILLY
INVENTOR
By Stephen H. Frishouf

United States Patent Office 3,381,300
Patented Apr. 30, 1968

3,381,300
CHART RECORDER FOR USE WITH METALLIZED PAPER
Jean Degonde and Henri Bailly, Paris, France, assignors to Thomson-Medical-Telco, Paris, France, a corporation of France
Filed July 18, 1966, Ser. No. 565,896
Claims priority, application France, July 20, 1965, 25,299
3 Claims. (Cl. 346—35)

ABSTRACT OF THE DISCLOSURE

A bank of metal styli bear transversely against a web of metallized paper; the styli are assigned increasing voltage level values and energized in accordance with such values so that the time during which the signal exceeds the given value, a line is formed on the travelling paper, the wave shape of the entire signal being given by the envelope of all the lines.

---

The present invention relates to a chart recorder for use with metallized paper and more particularly to a moving strip chart recorder to record wave shapes.

Permanent recorders, to record the envelope or amplitude wave shape of signals are frequently utilized in connection with electronic apparatus. For example, recording of oscillographic curves is an important aspect of electronic signal analysis. In their usual form, a movable strip of paper, which may be electro-sensitive, is rolled from a payout reel to a take-up spool below a scriber or pen, which is ordinarily mechanically coupled to a galvanometer of low inertia. Such apparatus has the disadvantage of mechanically loading the galvanometer, of poor frequency response due to mechanical inertia, and of extreme sensitivity to shock or other mechanical abuse.

It is an object of the present invention to provide a strip chart recorder which operates entirely electrically, is not sensitive to shock or position, and has high-frequency response.

Briefly, in accordance with the present invention, a strip chart recorder has a ribbon or band of electro-sensitive paper, such as metallized paper, rolled off over a support. A main electrode is provided to make contact with the metallized portion of the paper. In order to inscribe a curve, a plurality of metallic elements, such as metal springs, stylus points, lamellae or the like are arranged along a line transverse to the motion of the paper. They are retained in an insulating member, so that various lamellae are electrically separated from each other.

A sampling, or amplitude detecting circuit is provided, which detects the instantaneous amplitude of an input signal desired to be recorded. Each one of the metallic elements is assigned a certain value of signal, above a reference, depending upon its position along the straight line transverse to the paper. If the signal value exceeds the value assigned to the particular metallic element, a source of electric current is connected to the metallic element and between the main electrode. This source is strong enough in order to mark the electro-sensitive paper with a line, as the paper is rolled off below the metallic element. If the amplitude value of the input signal exceeds the value assigned to a number of these metallic elements, then a series of parallel lines, their length depending upon the duration that the signal exceeds the value assigned to a particular metallic element, will be inscribed on the paper. The envelope of these lines is an indication of the signal envelope with respect to time.

Since a value of the signal of zero does not cause any output, a separate, preferably centrally located metallic element may be permanently connected to scribe a zero or reference line. The source of power to energize the metallic elements, forming contact with the paper, may be interrupted so that a series of lines, with equal spaces, are formed. If the pulse rate of interruption is known, spacing between pulses provides a time scale independent of the speed of the paper strip.

The amplitude of the signal may have a positive, or negative value with respect to zero. A pair of channels may thus be provided, each one of the channels being assigned a number of the metallic elements, symmetrically located with respect to the central, or zero reference line.

The recorder in accordance with the present invention has a frequency response which is very high and limited only by the speed of travel of the paper therebeneath. Since it does not have any mechanically moving elements, other than the transport for the paper which, however, is independent of the recording of the wave shape, it is insensitive to shock or mishandling. The supply of electrical power to metallic elements which actually cause the recording is independent of the applied input signal—the applied input signal operating relays, which may be electronic, to supply a constant source of power to these metallic scribe elements, independent of the value of the applied signal.

The wave shape envelope is not traced out in a continuous curve, but rather the space beneath a series of parallel lines, of various lengths, determines the envelope. This is not a serious disadvantage, since the shape of the wave can still be accurately determined and, if the metallic elements are thin and closely spaced, the aspect of the envelope will practically be a continuous wave.

The structure, organization and operation of the invention will now be described more specifically in the following detailed description with reference to the accompanying drawings, in which.

Figure 1:
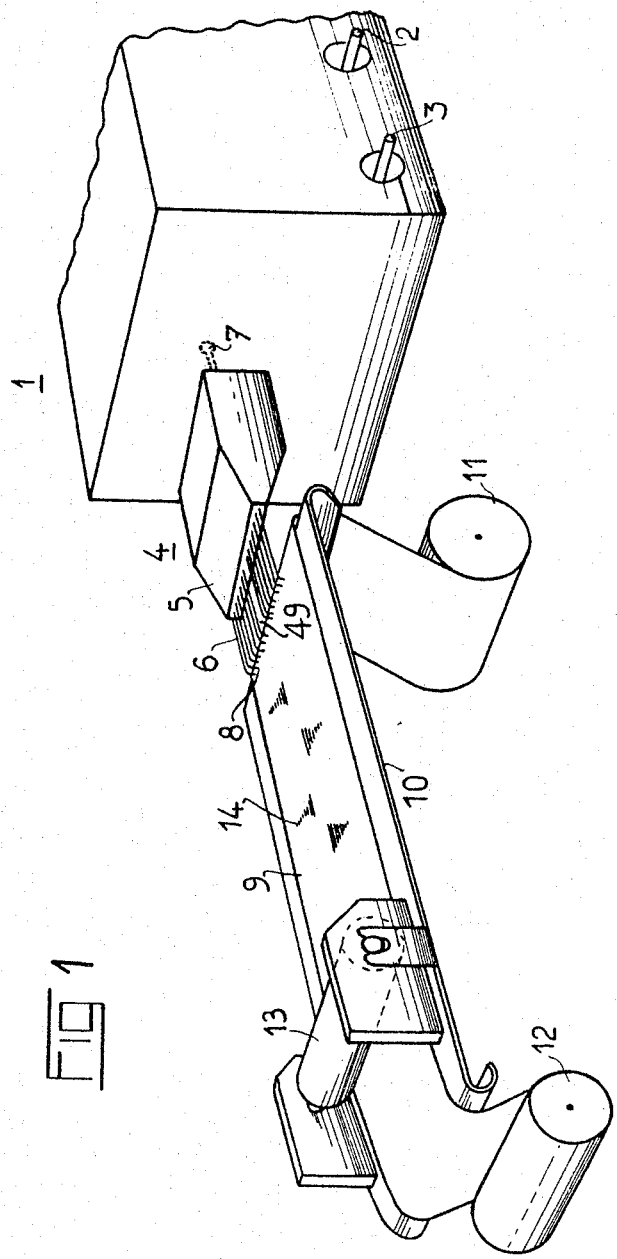
FIG. 1 is a perspective view, schematically, of a recorder according to the present invention, omitting unessential, well-known elements.

Referring now to the drawings, wherein like reference numerals denote like parts, and in particular to FIG. 1: An oscillograph-curve recorder has input signals, from a measuring apparatus applied to terminals 2, 3, secured to housing 1, which also contains the electronic parts of the apparatus of the present invention. Secured to the housing 1 is a scriber or recorder part 4, having a scribe holder 5 in insulating material, such as plastic. Secured within the scribe holder, for example by being molded therein and insulated from each other, are a series of metal spring wires or lamellae 6, which may also be formed as spring loaded pins or the like. The lamellae or metal springs 6 are arranged in a common plane, transverse to the travel of a strip of metallized paper 9, and along a straight line. One end 7 of the elongated spring wires extends into the interior of housing 1, as shown in dashed line with respect to one of these wires, only, in FIG. 1. The other end, 8, lightly touches the metallized surface of the recording strip 9. It is bent to have a point contact with the paper. The paper 9 is supplied from a pay-out reel 11, over a support 10 and rolled on a take-up reel 12. Reels 11, 12, are shown schematically only; the drive mechanism for the paper itself has been omitted from the drawing as it is well-known in the art. An electrode 13 is located at a position remote from the metal wires 6 and presses against the metallized surface of the paper 9.

An input signal, the envelope of which is to be recorded on the paper 9, is applied to terminals 2 and 3, and transformed by the electronic equipment inside housing 1 in such a manner that a potential difference will arise between electrode 13 and one or more of the metal styli or elements 6. The number of metallic elements 6 placed under tension depends upon the amplitude value, with respect to a reference, of the signal applied to terminals 2, 3, and is greater as the amplitude increases.

The difference in potential produced between the electrodes 13 and any one of the metallic elements 6 is of such value that the current density, negligible beneath the electrode 13 because of its great area of surface contact, is sufficiently great beneath the stylus 6 in order to produce an intense point of heat and vaporization of the metallization of the metallized paper 9. Thus, a darkening, preferably a blackening occurs. As the ribbon or strip 9 travels over support 10, the successive marks become segments of a line appearing beneath the track formed by the stylus which has been placed under electrical tension. FIG. 1 shows a series of such lines, indicated at 14. The envelope defined by these lines is the curve representative of the signal applied to terminals 2, 3.

Figure 2:
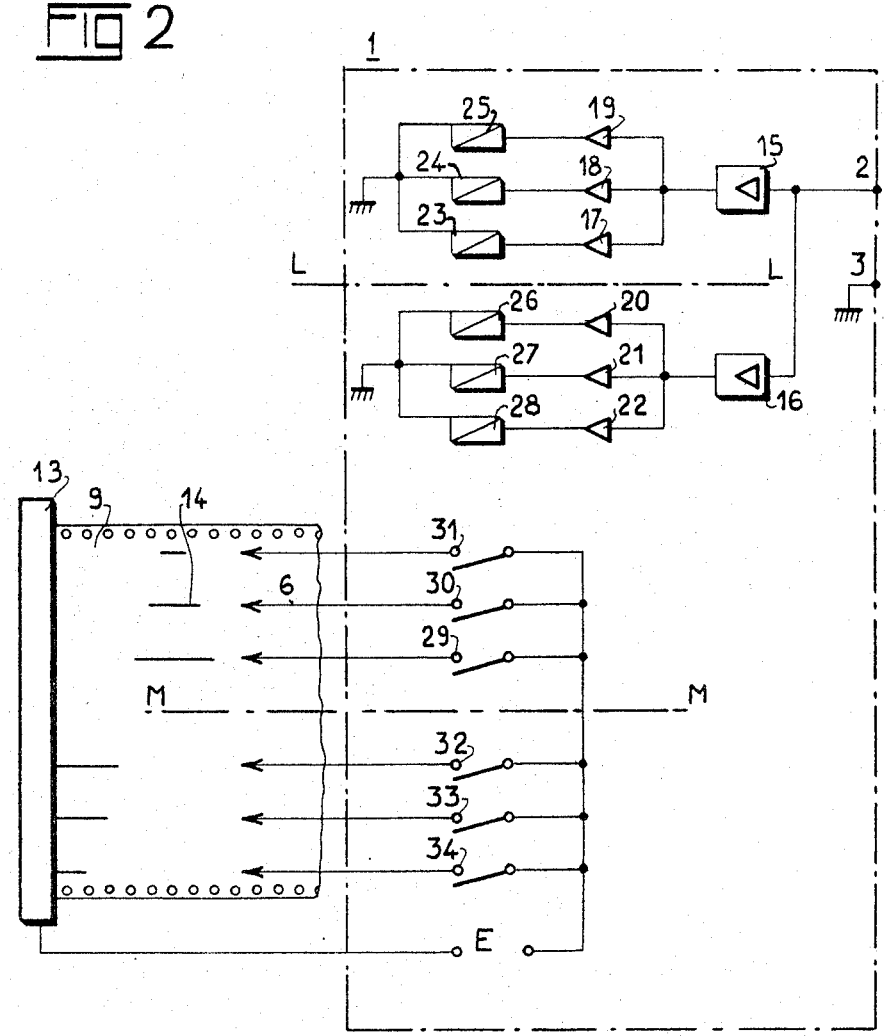
FIG. 2 is a circuit diagram of the recorder in the present invention.

The electronic circuit contained within housing 1 is shown in more detail in FIG. 2. The input signal is applied again to terminals 2, 3, and then applied to amplifier 15, 16, shown schematically only. Amplifier 15, 16, are polarized and transmit positive and negative portions of the signals applied to terminals 2, 3, with respect to a reference. The output of amplifier 15, 16, is connected to a sampling or measuring circuit which determines the amplitude of the signal within the two parallel channels. Each channel contains essentially an amplitude reference element and a control element or switch to apply power to this particular stylus corresponding to an amplitude value of the input signal. The amplitude value of the signal applied can readily be determined by means of threshold, or Zener diodes having different amplitude or breakdown values; or by diodes connected to a biasing circuit; or by other circuits such as back-to-back connected transistors well-known in the art. The control circuit for the current supply to the metallic element 6 is here shown as a relay circuit having a control element 23–28, such as a control coil and contacts 29–34. Rather than mechanical relays, electronic relays, silicone-controlled rectifiers, silicone-controlled switches and the like, can be used.

For simplicity in description, the supply circuit is shown with only six current paths, three on each side of the reference, although it is to be understood that any number can be used. The number, in principle, is equal to the number of metallic elements 6. These metallic elements are so arranged on their line transverse to the travel of the paper, that they are symmetrical with respect to a median line corresponding, electrically, to the reference level L—L. The current paths within one channel, each being assigned a value with respect to a reference as determined by the threshold of diodes 17, 18 or 19, in the positive direction and 20, 21, 22 in the negative direction correspond to similar current paths determined by switches 29, 30, 31 and 32, 33, 34 to supply the metallic elements 6. The current path, from a source E, is completed by the metal of the metallized strip of paper 9 and electrode 13.

The reference elements for the amplitude value 17–22 are so chosen that each element has a threshold value which corresponds to a proportionate value within its position in the channel, and likewise corresponds to a value determined by the distance of the corresponding metallic element 6 from a center line M—M on the paper 9. When one current path is in the state of conduction, the coil inserted into the current path is energized and controls closure of the corresponding working contacts. The power source E is of sufficient tension to produce blackening of the paper due to vaporization of the metal of the metallic paper 9, and the amount of power supplied to the contact formed beneath the points 8 of metallic elements 6 and the paper is independent of the amplitude value of the signal applied to terminals 2, 3. As any one of the metallic elements 6 is energized, which occurs as soon as the amplitude value applied to terminals 2, 3, exceeds the threshold of the associated sensing element 17–22, a line will be formed on the paper, as shown at 14 on FIG. 2, the envelope of which represents the curve of the wave applied to terminals 2, 3. The lines on one side of reference M—M on the paper 9 will represent a positive level, and the lines on the other a negative level. It is preferred to separate the styli 6, connected to switches 29–31, 32–34 by a gap 49 (FIG. 1) which corresponds to twice the separation of the styli from each other. Thus, a space corresponding to the fictitious value of null or zero is provided, aligned with the center line M—M. It may be utilized, in accordance with another embodiment of the present invention, to place a center stylus, permanently connected to the source of power.

Figure 3:
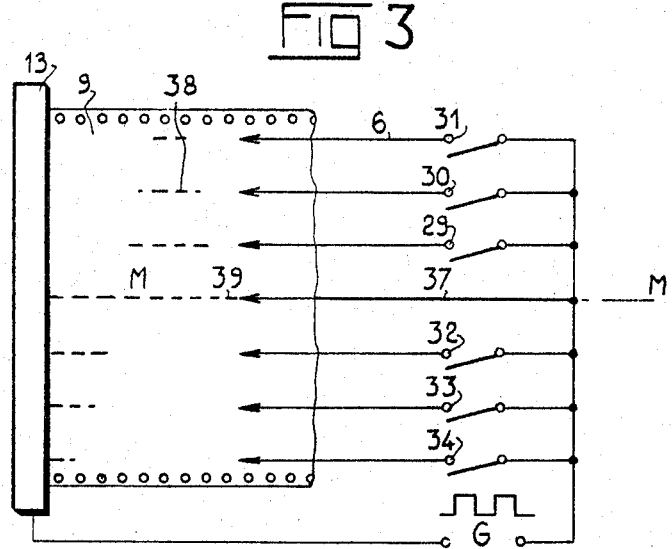
FIGS. 3 and 4 are partial circuit diagrams of different embodiments of the recorder in accordance with the present invention.

FIG. 3 illustrates an embodiment wherein a center stylus 37 is placed in the gap 49, in order to trace a line corresponding to the zero or reference level. It is permanently connected to a generator, or source of power G. Whereas the source E (FIG. 2) generally is a source of unidirectional current, source G is an interrupted, or square wave current, pulsed unidirectionally. This provides a center or reference line 39, which is dashed. If the gap between energization, that is between pulses is equal to pulse length, an evenly spaced dashed line will be formed in the center, providing a time reference. The other styli, if likewise connected to the pulse source G, will also be in dashed form as shown at lines 38, FIG. 3. Thus, the time reference can readily be read both by the number and the respective alignment of the dashed marks on the paper.

The amplitude value assigned to adjacent styli, as they are arranged within their support 5, may be linear, or non-linear. By providing amplitude references 17, 18, 19 and 20, 21, 22, which progress non-linearly, for example logarithmically, signal compression of the amplitude of the signal and transformation from linear to logarithmic representation can be obtained directly, without the use of pre-marked or printed paper.

Figure 4:
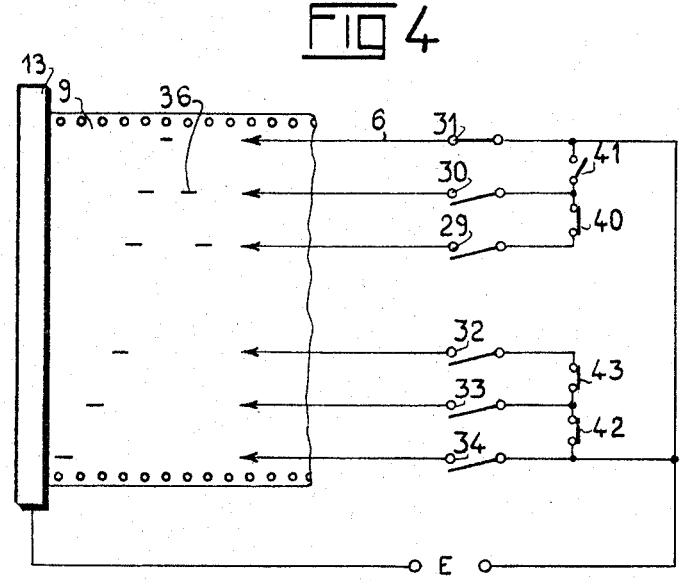

The embodiment illustrated in connection with FIGS. 2 and 3 provides for the writing of parallel lines on paper, each one of the lines having a length determined by the period of time during which the signal amplitude value exceeds a certain level. It is also possible to provide recording which approaches that of an envelope trace, or rather recording in which a series of short marks are provided so that only the instantaneous peak value is recorded in form of a very short line. The eventual curve will be in the form of a series of unconnected short dash marks, stepped from each other. Supplementary contacts, 40, 41, for one channel and 42, 43 for the other are inserted into the common supply. These contacts are connected to be operated by the same relay coils as contacts 30, 31, and 33, 34 respectively, that is they are connected to the relay of the next higher value. they are normally closed, and arranged to open as soon as the relay closes. Thus, supply to the metallic element 6 of current from generator E is cut as soon as an element corresponding to the next higher amplitude value is energized. Thus, a trace as shown at 36, FIG. 4, results which shows in general only a trace of the maximum signal value applied to terminals 2, 3. The circuit in accordance with FIG. 4 thus functions as a combination peak detector and maximum signal recorder.

If only signals of one polarity are expected, it is not necessary to have a pair of amplifiers, which are polarized, as shown in FIG. 2, but a single amplifier is sufficient; also, a single amplifier may be utilized and positive and negative signals can be separated by means of reversely connected diodes, that is by inverting the diodes 20, 21, 22 with respect to the diodes 17, 18, 19.

Input amplifiers 15, 16 are desirable in order to avoid loading of the signal applied to terminals 2, 3. If sufficient input signal is available, then amplifiers 15, 16 may be omitted and the signal applied directly to the amplitude sensing circuit to provide a plurality of current paths, each assigned a progressively increasing amplitude value.

We claim:

1. A chart recorder comprising a support adapted to have a strip of metallized paper travel thereover; common electrode means arranged for contact with said metallized paper; a plurality of metallic elements located adjacent each other and electrically insulated from each other arranged transverse to the path of said paper and contacting said paper along a straight line; said elements being assigned an amplitude value depending upon their position along said line transverse said paper; power supply means including an input circuit to receive a signal; a sampling circuit sampling the amplitude of said signal; a power source; and means connecting those of said metallic elements to said power source which correspond to the assigned value of amplitude of said signal, including means interrupting the connection to a metallic element assigned to a lesser value than the maximum value current path being energized.

2. A chart recorder comprising a support adapted to have a strip of metallized paper travel thereover; common electrode means arranged for contact with said metallized paper; a plurality of metallic elements located adjacent each other and electrically insulated from each other arranged transverse to the path of said paper and contacting said paper along a straight line; said elements being assigned an amplitude value depending upon their position along said line transverse said paper; power supply means including an input circuit to receive a signal, including a pair of channels, one channel each being assigned positive and negative values with respect to a reference; the central metallic element of said plurality of metallic elements being permanently connected to said source to represent said reference; a power source; and means connecting those of said metallic elements to said power source which correspond to the assigned value of amplitude of said signal.

3. Recorder as claimed in claim 2 wherein said source is a pulsed DC source.

References Cited
UNITED STATES PATENTS

| | | | |
|---|---|---|---|
| 3,214,764 | 10/1965 | Williams | 346—139 |
| 3,277,245 | 10/1966 | Sponga | 346—35 |
| 2,659,650 | 11/1953 | MacDonald | 346—34 |
| 2,659,651 | 11/1953 | Benno | 346—34 |

RICHARD B. WILKINSON, *Primary Examiner.*

E. SIMMONS, *Assistant Examiner.*